United States Patent

[11] 3,615,705

[72] Inventors Willibald F. Kohl
Nanuet;
John C. Sourby, Mount Kisco, N.Y.;
Rudolph H. Ellinger, Chagrin Falls, Ohio
[21] Appl. No. 32,760
[22] Filed Apr. 28, 1970
[45] Patented Oct. 26, 1971
[73] Assignee Stauffer Chemical Company
New York, N.Y.
Continuation-in-part of application Ser. No. 694,850, Jan. 2, 1968.

[54] PROCESS FOR THE PASTEURIZATION OF EGG WHITES
6 Claims, No Drawings
[52] U.S. Cl. ........................................ 99/161, 99/113, 99/211
[51] Int. Cl. ........................................ A23b 5/00, A23l 1/32

[50] Field of Search........................................... 99/211, 215, 161, 113, 216; 96/113

[56] References Cited
UNITED STATES PATENTS
3,471,302  11/1969  Rogers ........................ 99/161
2,776,214  1/1957   Lloyd et al. ................. 99/161
3,364,037  1/1968   Mink ........................... 99/161

Primary Examiner—Norman Yudkoff
Assistant Examiner—Hiram H. Bernstein
Attorneys—Wayne C. Jaeschke, Daniel S. Ortiz and Martin Goldwasser ABSTRACT: A process for pasteurizing egg whites which comprises the steps of raising the pH of the egg whites about 0.5 to 1.5 units above the natural pH thereof. The egg whites are then heated to destroy the natural catalase. Then, a responsive amount of a peroxide material is added to the egg whites which are then reheated to a pasteurization temperature.

PROCESS FOR THE PASTEURIZATION OF EGG WHITES

CROSS-REFERENCE TO RELATED APPLICATION

This application is a continuation-in-part of our pending application, Ser. No. 694,850, filed Jan. 2, 1968.

BACKGROUND OF THE INVENTION

There are a number of food poisoning micro-organisms that cause serious problems in the food industry. Among these different spoilage organisms which may contaminate foodstuff, the group Salmonellae have gained special importance. Salmonellae are pathogenic gram-negative rodlike bacteria that have drawn much recent attention that is well documented in the literature. Of the several food areas involved, particular interest has been generated in the reduction of Salmonellae in egg products. The contents of an egg with unbroken shell may already contain bacteria caused by the infection of a laying hen. The exterior surface of the egg may be contaminated with bacteria from the intestinal tract of the hen, from the nest or from other material contacted after laying. Some of these can be introduced into egg products during breaking operations. Bacteria can also penetrate the shell from outside. The invading micro-organisms infect the egg and can be carried on into a variety of egg products.

The elimination of Salmonellae by pasteurization of egg products has become mandatory under United States Department of Agriculture regulations. According to these regulations all egg products have to be pasteurized regardless of whether they are to distributed in frozen, liquid or dried form.

There are problems in pasteurization that are peculiar to egg whites as compared to whole eggs or yolks. All pasteurization processes for egg whites must be a compromise between the amount of heat applied to kill Salmonellae and the coagulation of the egg proteins, which effect the functional properties thereof. Although naturally occurring levels of Salmonellae are seldom greater than 100 per milliliter of egg product, present processes have need of improvement to minimize undesirable effects on functional properties or excessive; buildup on plant equipment. Present processes also lack retained inhibitory effects after pasteurization.

At present, there exist several processes which give acceptable destruction of Salmonellae in egg whites. One of these processes is described and claimed in U.S. Pat. No. 3,251,697, which involves the addition of a food grade acid to lower the pH of the egg whites from about 9.0 to about 7.0, and with the addition of aluminum or other metal ions to stabilize the egg proteins against coagulation at higher temperatures. These materials may be added to give a concentration of 30 parts per million as aluminum, added in the form of aluminum sulfate and 0.15 percent lactic acid in the egg whites. The egg whites may then be pasteurized at a temperature of 140° to 143° F., at a holding time of 3.5 minutes. This procedure is reported to destroy one million added Salmonellae per milliliter. However, it has been found in practice that the bacterial count in this process is relatively high after treatment. Also, the aluminum sulfate in the egg whites will cause the appearance of small particles of precipitated egg proteins.

Another proposed solution to killing the bacteria within the egg whites is described and claimed in U.S. Pat. No. 2,776,214. This process involves taking the egg white at its normal pH, heating it to 100° to 130° F. for a period of 0.5 to 5 minutes. This is claimed to largely inactivate the indigenous catalase. Thereafter, sufficient hydrogen peroxide solution is metered in to give a concentration of 0.1 percent peroxide in the egg whites. The egg whites are then reheated and they are cooled and catalase is added to destroy the residual peroxide. This process is reported to produce sterile egg white. This process has a serious drawback because a relatively high amount of bacteria may survive the pasteurization process when heat resistant bacteria strains are present in the egg whites.

BRIEF DESCRIPTION OF THE INVENTION

It has been discovered that the number of Salmonellae bacteria killed during pasteurization thereof can be materially increased by incorporating within the egg whites an alkali agent to adjust the pH from about 0.2 to about 1.5 units above the natural pH of the egg whites. Thereafter, the egg whites are heated to destroy the natural catalase and then a peroxide material is added in an amount ranging between about 0.01 to 1.5 percent by weight. The egg whites are then reheated up to about 130° F. It has been found that with the use of the alkali agent the hydrogen peroxide materially increases the kill of the Salmonellae bacteria and also provides for residual killing thereof which is heretofore unknown. It has also been found that the employment of a single heating step subsequent to adjustment of pH and addition of peroxide gives highly satisfactory results.

DETAILED DESCRIPTION OF THE INVENTION

In the practice of the present invention, egg whites are separated from yolk material in a conventional manner. As is well known, the pH of the egg whites is approximately 9.0. Then, an alkaline agent is added to adjust the pH of the egg whites from about 0.2 to about 1.5 units above the natural pH. The egg whites are then heated up to about 130° F. or between about 115° and 135° F. for about 0.5 to 5 minutes. After the egg whites have been heated to this temperature, the natural catalase is destroyed. This heating step is optional in the practise of this invention. They they are treated with hydrogen peroxide. The amount of hydrogen peroxide added may range between 0.01 to 1.5 percent, preferably about 0.05 to 0.5 percent by weight. Thereafter, the egg whites are heated to a temperature of between about 115° to about 135° F. for 0.5 to 5 minutes.

The alkali agent employed with the present invention is selected from the group consisting of sodium hydroxide, potassium hydroxide, sodium phosphate, sodium bicarbonate, and the like.

By adjusting the pH of the egg whites with the alkali agent as noted above, it has been found the the kill power of the additives along with the heat of pasteurization, materially increases the kill of the Salmonellae heretofore unknown. Also, the presence of the alkali material within the eggs provides residual killing power of Salmonellae after the eggs have been cooled and pH thereof readjusted to the natural level.

In order to illustrate the merits of the invention, the following examples are provided:

EXAMPLE 1

Fresh egg whites were obtained in a hand operation by separating the same from the yolks and mixed to form a uniform batch. The natural pH of the egg whites was determined to be 8.6. A bacterial culture of *Salmonellae senftenberg* 775W was added to the egg whites to provide a concentration thereof of 170,000 per milliliter of egg whites. Then, a 10 percent solution of sodium hydroxide was added thereto to raise the pH to 9.5. The egg whites were then heated for 1.5 minutes at 130° F. to destroy the natural catalase. Thereafter, hydrogen peroxide was added to the egg whites to provide a concentration of 0.1 percent by weight of the egg whites. The egg whites were then reheated to 130° F. for 3.5 minutes holding time. The egg whites were cooled quickly to 40° F. Catalase was then added to destroy the hydrogen peroxide. An assay of the egg whites in using standard microbiological procedures indicated that the sample was Salmonellae negative.

EXAMPLE 2

The procedure as set forth in example 1 was repeated in its entirely, except the sodium hydroxide additive was omitted. An assay of the pasteurized egg whites using standard microbiological procedures indicated a survival of 43 Salmonellae per milliliter of egg white.

EXAMPLE 3

The procedure as outlined in example 1 was repeated in its entirely except the hydrogen peroxide and sodium hydroxide were both omitted. An assay of the egg whites indicated a survival of 1220 Salmonellae per milliliter of egg white using standard microbiological testing methods.

EXAMPLE 4

Egg whites were obtained in a manner as set forth in example 1. A bacterial culture of *Salmonellae senftenberg* 775W was added to provide a concentration thereof of 9.2 millions per milliliter of egg white. Then, a 10 percent solution of sodium hydroxide was added dropwise to raise the pH from 8.6 to 9.5. After preheating the egg whites for 1.5 minutes at 130° F., 0.2 percent by weight hydrogen peroxide was added. The egg white was then heated to 130° F. for 5 minutes holding time. The pasteurized eggs were then assayed according to standard microbiological procedures, indicating Salmonellae negative.

EXAMPLE 5

The procedure as outlined in example 4 was repeated in its entirely except no hydrogen peroxide was added thereto. An assay of the pasteurized egg whites indicate a survival of 90 Salmonellae per milliliter of egg white.

EXAMPLE 6

The procedure as outlined in example 4 was repeated in its entirety except the addition of sodium hydroxide was omitted. An assay of the pasteurized egg whites indicated a survival of 50 Salmonellae per milliliter of egg white.

EXAMPLE 7

The procedure as outlined in example 4 was repeated in its entirety except the sodium hydroxide and hydrogen peroxide was omitted. The pasteurized egg whites were assayed in accordance with standard microbiological procedures indicating a survival of 190,000 Salmonellae per milliliter of egg white.

EXAMPLE 8

Egg whites were obtained in a manner set forth in example 1. A bacterial culture of *Salmonellae typhimurium* was added thereto to provide a concentration of 74 millions per milliliter egg white. Then a solution of 10 percent hydroxide was added dropwise to raise the pH of the egg whites to 9.2. The egg whites were heated to 128° F. for 1.5 minutes. Then, 0.2 percent by weight hydrogen peroxide was added to the egg whites. The egg whites were heated to 128° F. for 3.5 minutes holding time. After pasteurization, the egg whites were quickly cooled to 38° F. An assay of the pasteurized egg whites using standard microbiological techniques indicated Salmonellae negative.

EXAMPLE 9

The procedure as outlined in example 8 was repeated in its entirely except no additives were incorporated within the egg whites. An assay of the egg whites after pasteurization using standard microbiological procedures indicated a survival of 340,000 Salmonellae per milliliter.

EXAMPLE 10

The functional properties of the pasteurized egg whites of example 8 were tested. The functional properties are expressed by the specific volume of the egg whites and by the specific volume of the cakes baked with the pasteurized egg whites. Under both criterias, the specific volume of the whipped egg whites and also of the cakes showed that the egg whites pasteurized with the additives of example 8 are comparable to the functional properties of fresh egg whites indicating no damage in the functional properties.

EXAMPLE 11

The pasteurized eggs of example 1 were tested for any indication of an alteration of the functional properties. Accordingly, 176 grams of the egg whites were mixed with a kitchen style mixer for 90 seconds. The amount of foam thus generated was then measured. The quantity of foam produced is a measure of the degree of protein denaturing that may occur during pasteurization. The amount of foam produced by the egg whites in 90 seconds is inversely proportional to the amount of protein denatured during pasteurization. The volume of foam produced under these conditions is reported as specific volume determined by dividing the total amount of foam generated in milliliters, by the weight of the egg whites in grams. Thus, the specific volume of less than 3 indicates an excessive of the egg whites that is undesirable. The egg whites treated as set forth above had a specific volume of 6.3 After the specific volume of the egg whites had been measured, the baking performance thereof was measured by preparing angel food cake from the pasteurized egg whites. Thus, the 176 grams of egg whites were beat for an additional 2 minutes with the kitchen style mixer. Thereafter, 2.45 grams of cream of tartar, 0.70 grams of salt, and 84.0 grams of sugar were added. The mixture was then blended for an additional two minutes. Then, a blend consisting of 42 grams of flour and 45 grams of sugar was folded into the whipped egg whites. The resulting batter was placed in six inch pans and baked for 30 minutes at 355° F. After baking, the volume of the egg whites were measured by standard seed displacement techniques. The specific volumes were determined by dividing the weight of the cakes in grams into the total volume. The specific volume greater than 3 is indicative of acceptable egg white functional properties. In this instance, the specific volume was 4.4. Any changes in opacity of the egg whites due to pasteurization was measured by visual observation. An increase in opacity of the formation of solid protein particles is indicative of protein denaturization. The egg whites pasteurized in accordance with this invention were clear.

EXAMPLE 12

The pasteurized egg whites of examples 1 through 9 were assayed for bacterial flora count using standard microbiological procedures. The pasteurized egg whites were then stored at room temperature. At 24 hour intervals, the bacterial flora count was reevalutated for 3 consecutive days. The egg whites as pasteurized in accordance with examples 1, 4, and 8 indicated a decrease in bacterial flora count while all the other pasteurized egg whites indicated an increase in bacterial flora count.

EXAMPLE 13

This example illustrated the embodiment of the process of the present invention wherein only one final heating step is employed. The example also demonstrates the surprising and unexpected improvement in results of the process of the present invention as compared with the operation in accordance with U.S. Pat. No. 3,364,037.

A batch of two liter egg whites was collected, and inoculated with *Salmonellae typhimurium* which had been accustomed to growing in the egg whites. The pH of the egg whites was 8.9.

This batch of inoculated egg whites was divided, to compare the effectiveness of the process of this invention with the process such as is described in U.S. Pat. No. 3,364,037. Portions of egg whites were adjusted by drop-wise addition of 10 percent NaOH to pH values 9.4, 9.7 and 10.0.

For the prior art process, amounts of 2.64 milliliters of 30 percent $H_2O_2$ were added under stirring to 400 milliliters of egg whites providing 0.2 percent $H_2O_2$ at pH values of 9.7 or 10.0. Mild agitation was continued for five minutes. Samples were drawn for microbiological analysis after 5, 10, 30, and 60 minutes holding at 68° to 70° F.

For the process of the present invention the sequence of process steps was as follows:

1. Adjustment of pH with 10 percent NaOH to values of 9.4, 9.7, or 10.0;
2. Addition of 2.64 milliliters of 30 percent $H_2O_2$ per 400 milliliters of egg whites (0.2 percent);
3. Heating of egg whites to 127°–128° F. and holding the egg whites 3.5 minutes at this pasteurization temperature; and
4. Cooling.

The microbiological counts in the egg whites before and after processing, provide data to demonstrate the microbiological effectiveness of the processes. The decline or reduction in the numbers of Salmonellae for both methods is indicative of their efficiencies. The reductions of *Salmonellae typhimurium* achieved by both processes are shown in following table 1.

TABLE 1.—REDUCTIONS OF *SALMONELLA TYPHIMURIUM* IN LIQUID EGG WHITES TREATED WITH ALKALI AND 0.2% $H_2O_2$

| Process | Temp., °F. | Holding time (min.) | pH 9.4 Log. redn. | pH 9.4 Numeric. redn. factor | pH 9.7 Log. redn. | pH 9.7 Numeric. redn. factor | pH 10.0 Log. redn. | pH 10.0 Numeric. redn. factor |
|---|---|---|---|---|---|---|---|---|
| Present invention | 127–128 | 3.5 | 3.3 | 2,000 | 3.6 | 4,000 | 3.6 | 4,000 |
| U.S. Pat. 3,364,037 | 68–70 | 5 | | | 0.5 | 3.2 | 1.9 | 80 |
| | | 10 | | | 0.5 | 3.2 | 2.0 | 100 |
| | | 30 | | | 0.5 | 3.2 | 2.6 | 400 |
| | | 60 | | | 0.5 | 3.2 | 2.7 | 500 |

Referring to the table above, with egg whites at pH 9.7 the logarithmic reduction for the method of the present invention was about 3.6. This corresponds to the numerical reduction of the numerical of Salmonellae by a factor of about 4,000.

The process of the prior art patent had a pH of 9.7 yielded a logarithmic reduction of 0.5 or a numerical reduction of 3.2. For egg whites adjusted to pH 9.7 the process of the present invention thus eliminated over 1,000 times more bacteria than the process of the prior art patent.

With egg whites adjusted to an alkyline of pH 10.0 the process of the present invention at 3.5 minutes holding time eliminated 10 times as many Salmonellae as the process of the prior art patent with 30 minutes holding time.

What is claimed is:

1. A process for pasteurizing egg whites comprising the steps of:
   a. raising the pH of the egg whites about 0.2 to about 1.5 units above the natural pH;
   b. heating said egg whites to a temperature between about 115° F. and 135° F. for from about 0.5 to about 5 minutes;
   c. adding a responsive amount of a peroxide material to said egg whites;
   d. reheating said egg whites to a temperature between about 115° F. and 135° F. for about 0.5 to about 5 minutes to pasteurize them.

2. The process as set forth in claim 1, wherein the pH of said egg whites is raised with a food grade alkaline material.

3. The process as set forth in claim 2, wherein said alkaline material may be selected form the group consisting of sodium hydroxide, potassium hydroxide, sodium carbonate, ammonium hydroxide, calcium hydroxide, sodium phosphate, sodium bicarbonate, and mixtures thereof.

4. The process as set forth in claim 1, wherein said peroxide is present in an amount ranging between 0.01 and 1.5 percent by weight.

5. The process as set forth in claim 1, together with the additional steps of cooling said egg whites and readjusting the pH thereof to its natural level.

6. The process for pasteurizing egg whites comprising the steps of:
   a. raising the pH of the egg whites about 0.2 to about 1.5 units above their natural pH;
   b. adding an effective amount of a peroxide material to said egg whites; and
   c. heating said egg whites to a temperature between about 115° and about 135° F. for a sufficient time to pasteurize them.

PO-1050
(5/69)

UNITED STATES PATENT OFFICE
CERTIFICATE OF CORRECTION

Patent No. 3,615,705            Dated    October 26, 1971

Inventor(s) Willibald F. Kohl, John C. Sourby and Rudolph H. Ellinger

It is certified that error appears in the above-identified patent and that said Letters Patent are hereby corrected as shown below:

Col. 1, line 31, after "to" insert -- be --; line 40, after "excessive" delete : .

Col. 2, line 30, "They" should be -- Then --.

Col. 3, Example 7, line 39, "was" should be -- were --; Example 8 line 47, after "10 percent" insert -- potassium --.

Col. 4, Example 11, line 16, after "cessive" insert -- denaturing --; Example 13, line 56, "illustrated" should be -- illustrates --; Example 13, line 58, "The" should be --This--.

Col. 5, line 34, "numerical" should be -- number --.

Signed and sealed this 16th day of May 1972.

(SEAL)
Attest:

EDWARD M. FLETCHER, JR.           ROBERT GOTTSCHALK
Attesting Officer                   Commissioner of Patents